United States Patent
Pascual et al.

(10) Patent No.: US 6,555,087 B2
(45) Date of Patent: Apr. 29, 2003

(54) PROCEDURE FOR THE PRODUCTION OF POLYMERIC SULFUR

(75) Inventors: Juan Castro Pascual, Torrejon (ES); Fernando Temprano Posada, Madrid (ES); Jose Carlos Rojo Gonzalez, Madrid (ES)

(73) Assignee: Repsol Petroleo, S.A. (ES)

( * ) Notice: Subject to any disclaimer, the term of this patent is extended or adjusted under 35 U.S.C. 154(b) by 101 days.

(21) Appl. No.: 09/777,110

(22) Filed: Feb. 5, 2001

(65) Prior Publication Data

US 2001/0022958 A1 Sep. 20, 2001

(30) Foreign Application Priority Data

Feb. 8, 2000 (ES) .......................................... 200000263

(51) Int. Cl.$^7$ ............................................... C01B 17/02
(52) U.S. Cl. ................................... 423/511; 423/567.1
(58) Field of Search ...................... 423/567.1, 578.1, 423/511

(56) References Cited

U.S. PATENT DOCUMENTS

| | | | |
|---|---|---|---|
| 2,419,309 A | | 4/1947 | Belchetz ..................... 23/224 |
| 2,419,324 A | | 4/1947 | Missbach et al. ............. 23/224 |
| 2,513,524 A | * | 7/1950 | Schallis ....................... 23/224 |
| 2,534,063 A | | 12/1950 | Ross et al. ................... 23/225 |
| 2,757,075 A | * | 7/1956 | Haimsohn ..................... 23/224 |
| 4,234,552 A | * | 11/1980 | Stanley ....................... 423/268 |
| 4,238,470 A | * | 12/1980 | Young ..................... 423/567 R |
| 4,359,452 A | | 11/1982 | Shim ..................... 423/567 R |

FOREIGN PATENT DOCUMENTS

| | | |
|---|---|---|
| EP | 0053832 A | 6/1982 |
| RU | 1440340 A3 | 8/1985 |

OTHER PUBLICATIONS

Database WPI Section Ch, Week 199327 Derwent Publications Ltd., London GB; Class A60, AN 1993-217799 XP002170698 For RO 104 032 A (Comb Chim Tirnaveni) Abstract, Apr. 25, 1992.

* cited by examiner

*Primary Examiner*—Stanley S. Silverman
*Assistant Examiner*—Timothy C. Vanoy
(74) *Attorney, Agent, or Firm*—Ostrolenk, Faber, Gerb & Soffen, LLP

(57) ABSTRACT

A procedure for the production of polymeric sulfur with improved stability that comprises the stages of:

(a) cooling in a vessel for rapid cooling the sulfur vapor from the vaporization of molten sulfur, by bringing it into direct contact with a refrigerating suspension composed of carbon disulphide, soluble sulfur and polymeric sulfur, to a temperature such that part of the sulfur vapor is transformed into a powder-like polymeric sulfur, insoluble in carbon disulphide.

(b) extracting the resulting suspension from the cooling vessel;

(c) recycling part of said suspension to the vessel for cooling; and (d) sending the rest of the suspension to a maturation stage to stabilize the polymeric sulfur.

10 Claims, 1 Drawing Sheet

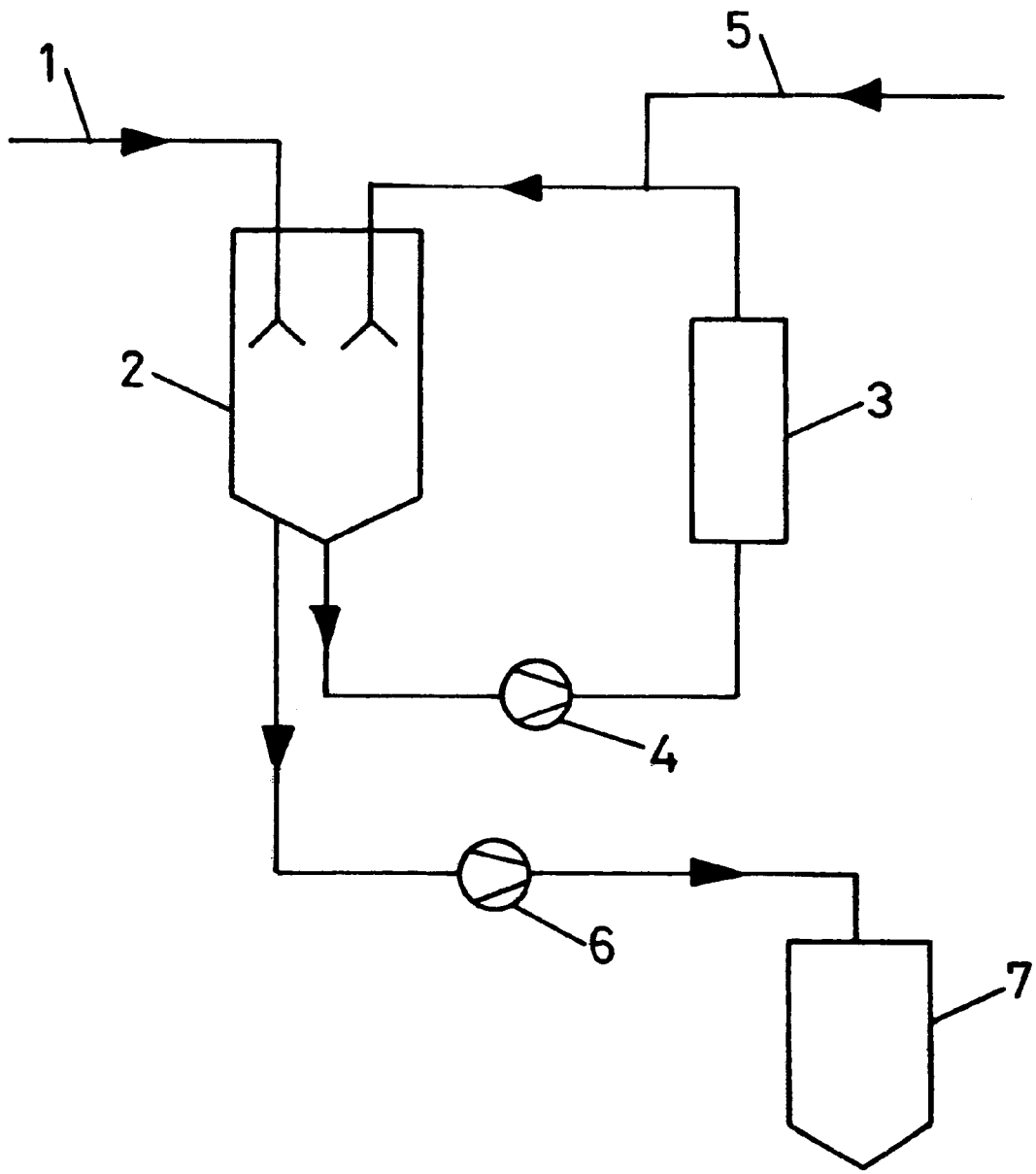

PROCEDURE FOR THE PRODUCTION OF POLYMERIC SULFUR

The invention relates to a procedure for the production of polymeric sulfur, also known as sulfur "mu" or as insoluble sulfur because it is insoluble in carbon disulphide. This form of sulfur of a polymeric nature, consisting of polymeric chains of up to several thousand atoms of sulfur, is metastable, that is, it evolves in time at a variable rate (greater at higher temperature) towards more stable allotropic (non-polymeric) forms that are soluble in carbon disulphide and other solvents.

The most important use of polymeric sulfur (insoluble sulfur) is as a vulcanising agent in the rubber manufacturing industry.

The basic process for the production of polymeric sulfur is old and well known in the state of the art.

Thus, in U.S. Pat. No. 2,419,309, a process is described for the production of polymeric sulfur which comprises heating a product of sulfur to vaporize it and then cooling it quickly in carbon disulphide at temperatures below 60° C. Most of the soluble sulfur goes into solution in the carbon disulphide, while the insoluble sulfur solidifies and remains in suspension in the carbon disulphide. The resulting insoluble particles of sulfur are then separated from the carbon disulphide by filtration, centrifugation and similar techniques, and are subsequently washed with carbon disulphide to separate additional quantities of soluble sulfur and finally dried.

The solution of soluble sulfur in carbon disulphide is then heated to evaporate off the carbon disulphide, which is recovered and recycled. The soluble sulfur which remains after evaporation of the carbon disulphide is melted and sent to the beginning of the process once again.

According to another process in the state of the art, small quantities of a hydrocarbonated oil are added, as auxiliary to the process, to the sulfur before vaporizing it. The oil seems to improve the characteristics of flow of the material to be processed. In addition, the use of hydrocarbonated oil appears to improve the thermal stability (measured as the percentage of polymeric insoluble sulfur that does not revert to soluble sulfur during a thermal treatment process) of the final product. It has been postulated that the improvements associated with the addition of hydrocarbonated oil are, in actual fact, due to presence of hydrogen sulphide generated by reaction between the hydrocarbonated oil and the sulfur.

However, the use of hydrocarbonated oil may have an adverse effect on the quality of the final product. The hydrocarbonated oil may be degraded during the processing of the sulfur, in which case the degraded oil will appear as a contaminant in the final product in the form of fine black flecks. These two processes from the state of the art, described previously, give rise to insoluble sulfur particles that are undesirably large, normally above around 200 microns. These particles, known as "tails", are separated from the bulk of the product and recycled once again to the process. Therefore, the coproduction of such tails may represent a loss in the production capacity.

The European patent no. 0053832 describes a procedure for the preparation of insoluble sulfur that comprises the stages of vaporizing the starting sulfur, mixing the vaporized sulfur with hydrogen sulphide, cooling rapidly the vaporized sulfur and separating the insoluble sulfur from the medium of rapid cooling. According to the process, the addition of hydrogen sulphide to the sulfur to be processed, the essential absence of hydrocarbonated sulfur, improves the characteristics of flow of the material which is being processed, improves the stability of the final insoluble sulfur product and virtually eliminates the coproduction of tails without the final product being contaminated with black flecks. As a medium for rapid cooling, carbon disulphide is used.

U.S. Pat. No. 1,440,340 describes a technique that seems to simplify the process of preparation of insoluble sulfur and which at the same time avoids contamination of the final product. According to this procedure of the state of the art, the starting liquid sulfur is vaporized and reheated in the presence of carbon disulphide at a pressure of 102–105 kPa up to a temperature of 890–950 K. The hot vapours consisting of sulfur and carbon disulphide are submitted to a rapid cooling with carbon disulphide until they reach a temperature less than the temperature of solidification of sulfur and less then that boiling point of carbon disulphide at the aforementioned pressure. In this way, a suspension of particles of insoluble sulfur form in liquid phase from whose suspension the solid phase is separated.

It has now been possible to show that in the stage of rapid cooling of the sulfur vapor, the polymeric sulfur generated forms a solid with plastic behaviour, in the form of laminas, which sticks easily to the walls of the receptacles and to the edges of the moving parts, making handling of the final product difficult and generating blockages in the paths through which it has to pass. The product so obtained evolves with time to a fine powder, which can easily be suspended in a solvent by means of agitation.

Therefore, the object of the present invention consists of providing a procedure by means of which it is possible to eliminate the plastic product obtained in the sudden cooling of the sulfur vapor, increasing the speed of the transition to a powder-like product with a particle size of 5–40 microns, to thus facilitate production in a continuous process. At the same time, the invention contemplates the realisation of a maturing stage of the polymeric sulfur obtained by rapid cooling of sulfur vapor, to improve the stability of the polymeric sulfur.

In accordance with that stated earlier, the invention provides a procedure for the production of polymeric sulfur of improved stability, characterised because it comprises the stages of:

(a) Suddenly cooling in a vessel for rapid cooling the sulfur vapor from the vaporization of molten sulfur, bringing it into direct contact with a refrigerating suspension composed of carbon disulphide, soluble sulfur and polymeric sulfur, to a temperature such that part of the sulfur vapor is transformed into a powder-like polymeric sulfur, insoluble in carbon disulphide, the remaining sulfur remaining dissolved in the carbon disulphide because it is soluble at a temperature and in the concentration range of the operation;

(b) Extracting the resulting suspension from the cooling vessel;

(c) Recycling part of said suspension to the vessel for cooling; and (d) Sending the rest of the suspension to a maturation stage to stabilize the polymeric sulfur.

In accordance with the procedure of the present invention, the sulfur vapor obtained from vaporization of molten sulfur, at a temperature between 450° C. and 750° C., preferably between 650° C. and 700° C., is fed to the cooling vessel where it is suddenly cooled by direct contact with a suspension of polymeric sulfur in carbon disulphide. The solvent, carbon disulphide, similarly has sulfur dissolved in it. The final temperature of the mixture lies between 55° C. and 80° C., preferably between 70 and 75° C. The sulfur vapor is partially transformed into polymeric sulfur, insoluble in carbon disulphide. The rest of the sulfur will go into solution as it is soluble at the temperature in the operating range of concentrations.

In the range of operating temperatures of 55° C. to 80° C., preferably between 70 and 75° C., in which the described process is carried out, the polymeric sulfur obtained modifies its plastic properties until it reaches a powder-like aspect. This evolution is more rapid the higher the temperature.

The yield in polymeric sulfur in the process described lies between 35 and 50%, depending on the conditions in which the cooling of the sulfur vapor is carried out.

The solution resulting from direct contact between the stream of vapor of sulfur and the refrigerating suspension leaves the vessel via a rotating device that prevents the release of agglomerated solids. Most of the output stream is recycled to the vessel and the remaining part goes continually to the following stage of the process, maturation, to be stabilized.

The flow of suspension that is recycled is cooled in a refrigerant such that the energetic balance of the system is maintained.

The recycled flow is dispersed on entering the vessel thus favouring contact between the refrigerating suspension and the sulfur vapor. The entrance into the condensation vessel of a large number of solid particles acts as a continuous seeding of points on which the polymer can grow in a very disperse manner, thus preventing the appearance of sticky laminas.

The concentration of solids in the suspension which leave the stage of condensation of sulfur lies between 6 and 12%, the preferred figure being 10%.

The large flow of recycling solution also has a mechanical cleaning effect on the walls of the vessel, eliminating material stuck thereto.

The flow of suspension that leaves the system of condensation of sulfur goes onto the maturation stage, in which the suspension is kept agitated at a temperature between 55 and 80° C., preferably between 70 and 75° C., and for a period of time greater than 30 minutes, preferably 60 minutes. The aim of this stage is to increase the thermal stability of the product obtained.

The thermal stability of the polymeric sulfur obtained is increased by between 15% and 25% with respect to the thermal stability of polymeric sulfur not submitted to this process of maturation. Because of the temperature at which the stabilisation is carried out, a small part of the polymer, between 1% and 5% of the polymeric sulfur, is transformed into soluble sulfur.

In the suspension thus obtained, the insoluble sulfur, soluble sulfur and carbon disulphide are separated by means of conventional techniques. These techniques known to the state of the art for treatment of solids sensitive to temperatures normally involve the physical separation of the insoluble sulfur, reaching a content in insoluble sulfur which is normally above 90% or, at times, even greater than 95%, drying by conventional procedures that avoid thermal degradation, addition and/or mixing with expander oils and packaging.

The invention will now be described with reference to the attached figure, which represents a flow diagram of the procedure for obtaining polymeric sulfur according to the invention.

In accordance with the flow diagram, the stream of sulfur vapor 1 enters the vessel 2, where it is mixed with the refrigerated recycling stream in the heat exchanger 3. The recycling stream is pumped by the pump 4. The recycling stream is mixed with a solution of sulfur soluble in carbon disulphide 5. From the vessel 2. the suspension is continually discharged and, by means of pump 6, is sent to another vessel for maturation 7.

The following examples of the practical embodiment of the invention will now be presented. Said examples are merely illustrative are do not limit the scope of the invention in any way.

EXAMPLE I

A stream of sulfur vapor with a flow rate of 3000 kg/hr at 700° C. is brought into contact with 1,386,090 kg/hr of a suspension at 67° C., composed of 848,155 kg/hr of carbon disulphide, 399,935 kg/hr of soluble sulfur and 138,000 kg/hr of polymeric sulfur. The final temperature in the vessel is 73° C. and the absolute pressure 2.2 kg/cm$^2$. Both the sulfur and the suspension are dispersed at the entrance to the vessel. The flow of suspension is pumped by a pump from the lower part of the vessel to the upper part thereof, the flow rate is 1,377,116 kg/hr of suspension with the following composition: 61.1% carbon disulphide, 28.9% soluble sulfur and 10% polymeric sulfur. To protect the pump from the arrival of agglomerated solids, a rotating element is placed at the output of the vessel. The fluid in recycling is refrigerated in a heat exchanger with water. At the output of the refrigerator, the recycled material is mixed with a stream of carbon disulphide and soluble sulfur from the stages of separation of these compounds of polymeric sulfur.

From the lower part of the vessel 11,975 kg/hr of suspension is extracted with a pump and sent to the maturation vessel where it is kept for a time of 60 minutes at a temperature of 73° C. and a pressure of 2.2 kg/cm$^2$. During this time, the solid is kept in suspension by stirring.

EXAMPLE II

A stream of sulfur vapor with a flow rate of 3000 kg/hr at 580° C. is brought into contact with 750,090 kg/hr of a suspension at 53° C., composed of 516,062 kg/hr of carbon disulphide, 173,271 kg/hr of soluble sulfur and 60,757 kg/hr of polymeric sulfur. The final temperature in the vessel is 57° C. and the absolute pressure 1.5 kg/cm$^2$. The flow of suspension is pumped by a pump from the lower part of the vessel to the upper part thereof. Both the sulfur and the suspension are dispersed at the entrance to the vessel. To protect the pump from the arrival of agglomerated solids, a rotating element is placed at the output of the vessel. The fluid in recycling is refrigerated in a heat exchanger with water. At the output of the refrigerator, the recycled material is mixed with a stream of carbon disulphide and soluble sulfur from the stages of separation of these compounds of polymeric sulfur.

From the lower part of the vessel 13,400 kg/hr of suspension is extracted with a pump and sent to the maturation vessel where it is kept for a time of 60 minutes at a temperature of 73° C. and a pressure of 2.2 kg/cm2. During this time, the solid is kept in suspension by agitation.

What is claimed is:

1. A procedure for the production of polymeric sulfur, characterised in that it comprises the steps of:

(a) quenching, in a cooling vessel, sulfur vapor by direct contact with a refrigerating suspension comprising carbon disulphide, soluble sulfur and polymeric sulfur, to a temperature of between 55 and 80° C. such that part of the sulfur vapor is transformed into a powdery polymeric sulfur, (b) recovering the resulting suspension from the cooling vessel;

(c) recycling part of said suspension to the cooling vessel; and (d) subjecting the rest of the suspension to maturation.

2. A procedure according to claim 1, characterised in that in stage (a) the sulfur vapor enters the cooling vessel for cooling at a temperature of between 450 and 750° C.

3. A procedure according to claim 2, characterised in that in stage (a) the sulfur vapor enters the cooling vessel at a temperature of between 650 and 700° C.

4. A procedure according to claim 3, in that in stage (a) the sulfur is quenched to a temperature that is between 70 and 75° C.

5. A procedure according to claim 1, characterised in that in the stage of maturation (d), the suspension is kept in agitation at temperatures between 55 and 80° C. for a time period of greater than 30 minutes.

6. A procedure according to claim 5, characterised in that once the suspension in the maturation stage is thermally stabilized, insoluble sulfur is separated therefrom.

7. A procedure according to claim 6, characterised in that in the stage of maturation (d), the suspension is kept in agitation at temperatures between 70 and 75° C. for a time period of 60 minutes.

8. A procedure according to claim 7, characterised in that in stage (a) the sulfur vapor enters the cooling vessel at a temperature of between 650 and 700° C.

9. A procedure according to claim 8, characterised in that in stage (a) the sulfur is quenched to a temperature that is between 70 and 75° C.

10. A procedure according to claim 1, characterised in that in stage (a) the sulfur is quenched to a temperature that is between 70 and 75° C.

* * * * *